United States Patent
Chen et al.

(10) Patent No.: US 11,075,719 B2
(45) Date of Patent: *Jul. 27, 2021

(54) WIRELESS COMMUNICATION METHOD SUPPORTING HARQ, USER EQUIPMENT, AND BASE STATION

(71) Applicant: HUAWEI TECHNOLOGIES CO., LTD., Guangdong (CN)

(72) Inventors: Xiaobo Chen, Beijing (CN); Brian Classon, Palatine, IL (US); Vipul Desai, Rolling Meadows, IL (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/576,340

(22) Filed: Sep. 19, 2019

(65) Prior Publication Data
US 2020/0014497 A1    Jan. 9, 2020

Related U.S. Application Data

(63) Continuation of application No. 15/590,381, filed on May 9, 2017, now Pat. No. 10,594,446, which is a
(Continued)

(51) Int. Cl.
*H04L 1/18*       (2006.01)
*H04L 5/00*       (2006.01)
(Continued)

(52) U.S. Cl.
CPC ......... *H04L 1/1835* (2013.01); *H04L 1/1812* (2013.01); *H04L 1/1822* (2013.01);
(Continued)

(58) Field of Classification Search
CPC ......... H04L 5/001; H04L 5/14; H04L 5/0055; H04L 1/1861; H04W 72/0453
See application file for complete search history.

(56) References Cited

U.S. PATENT DOCUMENTS 8,472,391 B2    6/2013  Earnshaw et al.
9,515,808 B2 *  12/2016 Damnjanovic ....... H04L 5/0078
(Continued)

FOREIGN PATENT DOCUMENTS

CN    101047431 A    10/2007
CN    101499889 A    8/2009
(Continued)

OTHER PUBLICATIONS

HTC, "Discussion on different TDD UL-DL configurations on different bands in Carrier Aggregation",3GPP TSG RAN WG1 Meeting #66 R1-112597,Athens, Greece, Aug. 22-26, 2011,total 2 pages.
(Continued)

*Primary Examiner* — Chandrahas B Patel
(74) *Attorney, Agent, or Firm* — James Anderson Harrison

(57) ABSTRACT

The present invention provides a wireless communication method supporting hybrid automatic repeat request. The method includes: sending first hybrid automatic repeat request (HARQ) process quantity indication information to a user equipment UE; and if second HARQ process quantity indication information is further sent to the UE, determining a second HARQ process quantity according to the second HARQ process quantity indication information, and performing data transmission with the UE according to the determined second HARQ process quantity. Correspondingly, the present invention further provides a base station and the user equipment. In the present invention, the base station and the user equipment can perform data communication with the UE based on different HARQ timing relationships and HARQ process quantities, thereby being capable of better supporting UEs adopting different functional characteristics.

26 Claims, 3 Drawing Sheets

| Sub-frame configuration notified through an SIB1 | D | S | U | U | D | D | S | U | U | D |

| Sub-frame configuration of a dynamic sub-frame | D | S | U | F | F | D | S | U | F | F |

Related U.S. Application Data continuation of application No. 14/538,592, filed on Nov. 11, 2014, now Pat. No. 9,667,388, which is a continuation of application No. PCT/CN2012/075369, filed on May 11, 2012.

(51) Int. Cl.
*H04L 5/14* (2006.01)
*H04Q 11/04* (2006.01)

(52) U.S. Cl.
CPC ............... *H04L 5/001* (2013.01); *H04L 5/14* (2013.01); *H04Q 11/0478* (2013.01)

(56) References Cited

U.S. PATENT DOCUMENTS

| | | | |
|---|---|---|---|
| 9,980,262 | B2 | 5/2018 | Gao et al. |
| 2008/0101285 | A1 | 5/2008 | Venkatachalam et al. |
| 2008/0225784 | A1 | 9/2008 | Tseng |
| 2009/0217119 | A1 | 8/2009 | Zhang et al. |
| 2009/0249153 | A1 | 10/2009 | Zhang |
| 2010/0085925 | A1 | 4/2010 | Kishiyama et al. |
| 2011/0317650 | A1 | 12/2011 | Venkatachalam et al. |
| 2013/0294363 | A1 | 11/2013 | Feng et al. |
| 2013/0308540 | A1 | 11/2013 | Abe et al. |
| 2014/0161090 | A1 | 6/2014 | Lee et al. |

FOREIGN PATENT DOCUMENTS

| | | |
|---|---|---|
| CN | 101686116 A | 3/2010 |
| CN | 101741452 A | 6/2010 |
| CN | 101754230 A | 6/2010 |
| CN | 101772073 A | 7/2010 |
| CN | 101926214 A | 12/2010 |
| CN | 102036427 A | 4/2011 |
| CN | 102263627 A | 11/2011 |
| CN | 102447546 A | 5/2012 |
| EP | 2242203 A2 | 10/2010 |
| EP | 2360984 B1 | 7/2018 |
| JP | 2012156972 A | 8/2012 |
| KR | 100972405 B1 | 7/2010 |
| RU | 2439849 C2 | 1/2012 |
| WO | 2009015092 A1 | 1/2009 |
| WO | 2010069379 A2 | 6/2010 |
| WO | 2010120808 A1 | 10/2010 |
| WO | 2011040852 A1 | 4/2011 |
| WO | 2012059031 A1 | 5/2012 |
| WO | 2012060842 A1 | 5/2012 |
| WO | 2013027985 A2 | 2/2013 |
| WO | 2013042936 A1 | 3/2013 |
| WO | 2013154276 A1 | 10/2013 |

OTHER PUBLICATIONS

3GPP TS 36.212 V10.5.0 (Mar. 2012),3rd Generation Partnership Project; Technical Specification Group Radio Access Network; Evolved Universal Terrestrial Radio Access (E-UTRA); Multiplexing and channel coding (Release 10),total 79 pages.

3GPP TS 36.331 V10.5.0 (Mar. 2012),3rd Generation Partnership Project; Technical Specification Group Radio Access Network; Evolved Universal Terrestrial Radio Access (E-UTRA); Radio Resource Control (RRC); Protocol specification (Release 10),total 302 pages.

3GPP TSG RAN WG1 Meeting #65 R1-111322, "Soft buffer handling for Rel-10 UEs",Ericsson, ST-Ericsson, May 8-13, 2011,total 9 pages.

3GPP TSG RAN WG1 Meeting #68bis R1- 121434,"Enhancement to Time-domain Resource Partitioning",LG Electronics, Mar. 26-30, 2012,total 2 pages.

3GPP TSG-RAN WG4 #60Bis R4-115208, "UE demodulation test scenario for CA soft buffer issue",NTT DOCOMO, Oct. 10-14, 2011,total 4 pages.

Huawei, HiSilicon, Cross-carrier scheduling design for TDD inter-band CA with different UL-DL configurations, 3GPP TSG-RAN WG1 Meeting #68bis R1-120972,Mar. 26-30,2012,total 8 pages.

NTT DOCOMO, PDCCH Enhancement for Different TDD UL-DL Configuration on Different Bands, 3GPP TSG-RAN WG1 Meeting #68 R1-120670,Feb. 6-10, 2012,total 6 pages.

Pantech, PUSCH HARQ/scheduling timing in inter-band CA with different TDD UL-DL configuration, 3GPP TSG-RAN WG1 Meeting #68bis R1-121357, Mar. 26-30, 2012,total 6 pages.

U.S. Appl. No. 61/526,674 priority document,International application No. PCT/KR2012/006596, filed Aug. 20, 2012, total 33 pages.

WO2013042936 priority document,International application No. PCT/KR2012/007497, filing date: Sep. 19, 2012,total 165 pages.

XP032202278_Yong Li et al"Control channel design for carrier aggregation between LTE FDD and LTE TDD systems", May 6, 2012,total 6 pages.

XP050555010_TS 36.211 V10.4.0,"3GPP Technical specification group radio access network;Evolved Universal Terrestrial Radio Access (E-UTRA); Physical Channels and Modulation (Release 10)", Dec. 12, 2011,total 102 pages.

XP050562653_R1-120070,Ericsson et al"Remaining issues in general frame work for aggregation of carriers with different UL/DL configurations" Jan. 31, 2012,total 4 pages.

XP050562776_R1-120219,Panasonic"Views on open issues on inter-band CA with different TDD UL-DL configurations" Jan. 31, 2012,total 6 pages.

XP050563132_R1-120782,Ericsson et al"Assumptions for further evaluation of LTE TDD traffic adaptation",Jan. 31, 2012,total 4 pages.

XP050563412_R1-120873,CMCC"Email discussion summary on inter-band CA for supporting different TDD UL-DL configuration",Feb. 13, 2012,total 22 pages.

XP050579996_TS 36.213 v10.5.0,"3GPP Technical specification group radio access network;Evolved Universal Terrestrial Radio Access (E-UTRA); Physical layer procedures (Release 10)", Mar. 7, 2012,total 126 pages.

XP050599549_R1-121260,Alcatel-Lucent shanghai bell et al"discussion on HARQ and UL-grant timing with dynamic TDD UL-DL configuration", Mar. 20, 2012,total 6 pages.

XP050599742_R1-121461,LG Electronics"Issues in further enhancements to LTE TDD" Mar. 20, 2012,total 4 pages.

* cited by examiner

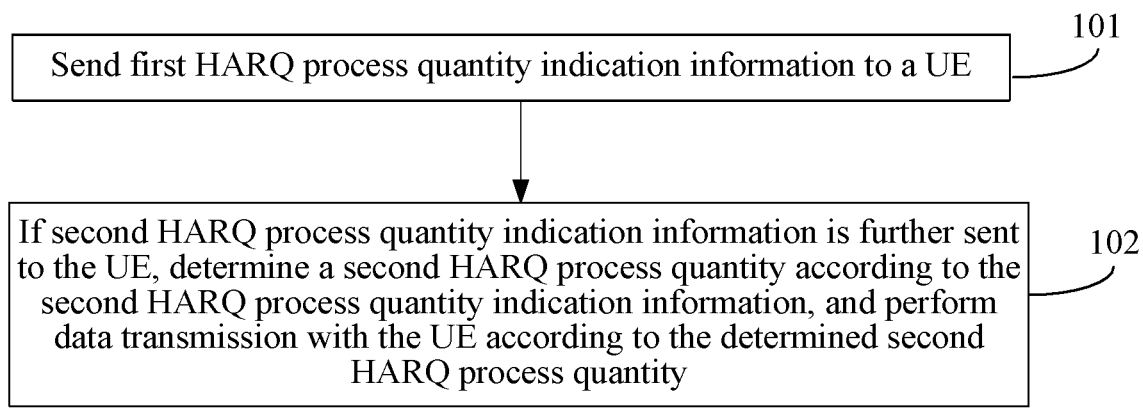
FIG. 1
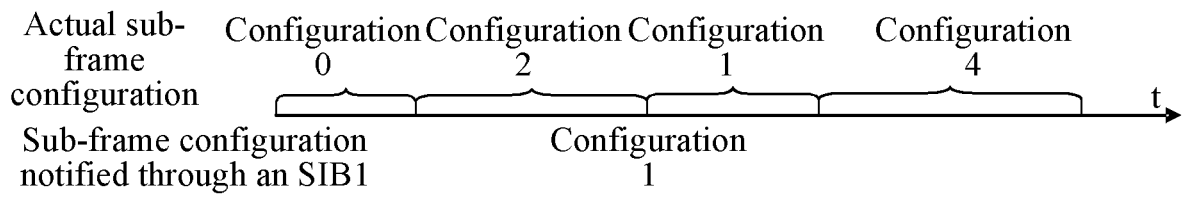
FIG. 2
FIG. 3

WIRELESS COMMUNICATION METHOD SUPPORTING HARQ, USER EQUIPMENT, AND BASE STATION

CROSS-REFERENCE TO RELATED APPLICATIONS

This application is a continuation of U.S. patent application Ser. No. 15/590,381, filed on May 9, 2017, which is a continuation of U.S. patent application Ser. No. 14/538,592, filed on Nov. 11, 2014, now U.S. Pat. No. 9,667,388, which is a continuation of International Application No. PCT/CN2012/075369, filed on May 11, 2012. All of the aforementioned patent applications are hereby incorporated by reference in their entireties.

TECHNICAL FIELD

The present invention relates to the field of wireless communications, and in particular, to a wireless communication method supporting hybrid automatic repeat request (HARQ), a user equipment, and a base station.

BACKGROUND

In a 3rd Generation Partnership Project (3GPP) Long Term Evolution (LTE) time division duplex (TDD) system, a wireless frame has a length of 10 ms, and contains 10 sub-frames. Each sub-frame has a length of 1 ms. A network side device may configure the sub-frame to transmit downlink data or uplink data. The LTE TDD system supports various uplink and downlink sub-frame configurations, as described in Table 1, where D represents a downlink sub-frame, S represents a special sub-frame, and U represents an uplink sub-frame. For example, a sub-frame configuration 0 is "DSUUUDSUUU". The network side device notifies, through a broadcasted first system information block (SIB1) message, a user equipment of a to-be-used sub-frame configuration.

TABLE 1

Sub-frame configurations supported by an LTE TDD system

| Sub-frame Configuration | Downlink-Uplink Switch Point Periodicity | Sub-frame Index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The LTE TDD system supports a physical-layer HARQ technology. A corresponding HARQ timing relationship and the maximum number of HARQ processes supported are defined for each sub-frame configuration in Table 1. Table 2 describes the maximum number of downlink HARQ processes $M_{DL\_HARQ}$ and the maximum number of uplink HARQ processes $M_{UL\_HARQ}$ supported in each LTE TDD sub-frame configuration, where a downlink HARQ process and an uplink HARQ process respectively refer to an HARQ process used for downlink data transmission and an HARQ process used for uplink data transmission. The HARQ process for uplink data transmission supports two modes, which are respectively called a normal HARQ mode and a sub-frame binding mode, and N/A represents that the sub-frame binding mode is not supported in a corresponding sub-frame configuration. In the normal HARQ mode, one transmission of an uplink data packet is performed only in one sub-frame; and in the sub-frame binding mode, one transmission of an uplink data packet is performed in more than one sub-frame, and different sub-frames transmit different redundancy versions of the uplink data packet respectively.

TABLE 2

Number of HARQ processes in different sub-frame configurations

| Sub-frame Configuration | Maximum Number of Downlink HARQ Processes $M_{DL\_HARQ}$ | Maximum Number of Uplink HARQ Processes $M_{UL\_HARQ}$ | |
|---|---|---|---|
| | | Normal HARQ Mode | Sub-frame Binding Mode |
| 0 | 4 | 7 | 3 |
| 1 | 7 | 4 | 2 |
| 2 | 10 | 2 | N/A |
| 3 | 9 | 3 | N/A |
| 4 | 12 | 2 | N/A |
| 5 | 15 | 1 | N/A |
| 6 | 6 | 6 | 3 |

During development of communications technologies, introduction of more advanced new functional characteristics, such as aggregation of TDD carriers having different sub-frame configurations, aggregation of a frequency division duplex (FDD) carrier and a TDD carrier, and TDD sub-frame configuration dynamic reconfiguration, is under discussion. There are multiple sub-frame configurations at this time, and carrier aggregation in the prior art is implemented only for carriers having the same sub-frame configuration, and therefore, to better support the new functional characteristics, an HARQ timing relationship used during communication between a UE and a base station is probably not an HARQ timing relationship corresponding to a sub-frame configuration notified through the SIB1 on the carrier. Moreover, when the used HARQ timing relationship is not the HARQ timing relationship defined by the sub-frame configuration notified through the SIB1, the base station and the UE may have inconsistent understanding on the maximum number of HARQ processes supported, which causes an error in size division of a soft buffer, and further results in a communication error.

SUMMARY

The present invention provides a wireless communication method supporting HARQ, a user equipment, and a base station.

One aspect of the present invention provides a wireless communication method supporting hybrid automatic repeat request, where the method includes:

sending first hybrid automatic repeat request HARQ process quantity indication information to a user equipment UE; and if second HARQ process quantity indication information is further sent to the UE, determining a second HARQ process quantity according to the second HARQ process quantity indication information, and performing data transmission with the UE according to the determined second HARQ process quantity.

Another aspect of the present invention provides a wireless communication method supporting hybrid automatic repeat request, where the method includes:

receiving first hybrid automatic repeat request HARQ process quantity indication information sent by a base station; and if second HARQ process quantity indication information sent by the base station is further received, determining a second HARQ process quantity according to the second HARQ process quantity indication information, and performing data transmission with the base station based on the determined second HARQ process quantity.

Another aspect of the present invention provides a base station, where the base station includes:

a sending module, configured to send first hybrid automatic repeat request HARQ process quantity indication information to a user equipment UE; and a processing module, configured to, if the sending module further sends second HARQ process quantity indication information to the UE, determine a second HARQ process quantity according to the second HARQ process quantity indication information, and perform data transmission with the UE through the sending module according to the determined second HARQ process quantity.

Another aspect of the present invention provides a user equipment, where the user equipment includes:

a receiving module, configured to receive first hybrid automatic repeat request HARQ process quantity indication information sent by a base station; and a processing module, configured to, if the receiving module further receives second HARQ process quantity indication information sent by the base station, determine a second HARQ process quantity according to the second HARQ process quantity indication information, and perform data transmission with the base station through the receiving module based on the determined second HARQ process quantity.

In the present invention, by sending the second HARQ process quantity indication information to the UE, the base station and the user equipment can perform data communication based on different HARQ timing relationships and HARQ process quantities, thereby being capable of better supporting UEs adopting different functional characteristics.

BRIEF DESCRIPTION OF THE DRAWINGS

To describe the technical solutions in the embodiments of the present invention more clearly, the following briefly introduces accompanying drawings required for describing the embodiments. Apparently, the accompanying drawings in the following description show merely some embodiments of the present invention, and a person skilled in the art may still derive other drawings according to these accompanying drawings.

FIG. 1 is a flowchart of a wireless communication method supporting HARQ according to an embodiment of the present invention;

FIG. 2 is a schematic diagram of a method for implementing TDD sub-frame configuration dynamic reconfiguration by setting a dynamic sub-frame;

FIG. 3 is a schematic diagram of a method for implementing TDD sub-frame configuration dynamic reconfiguration by notifying a dynamic sub-frame setting through a system message;

DETAILED DESCRIPTION

Figure 4:
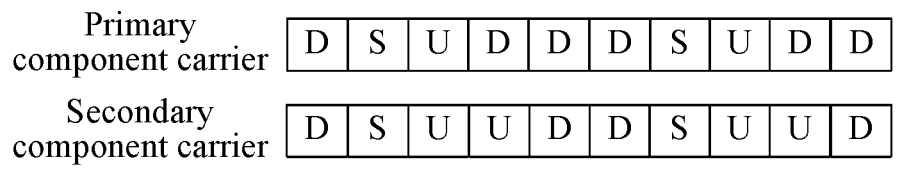
FIG. 4 is a schematic diagram of aggregation of TDD carriers having different sub-frame configurations according to an embodiment of the present invention.

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The embodiments of the present invention provide a wireless communication method supporting HARQ, a user equipment, and a base station, so as to solve a problem of how to implement that support is still well provided for a UE to perform communication with a base station when an HARQ timing relationship used during the communication between the UE and the base station is not an HARQ timing relationship corresponding to a sub-frame configuration notified through an SIB1 on a carrier after one or more advanced functional characteristics such as aggregation of TDD carriers having different sub-frame configurations, aggregation of an FDD carrier and a TDD carrier, and TDD sub-frame configuration dynamic reconfiguration are introduced. The advanced functional characteristics described in the embodiments of the present invention include one or more of the aggregation of TDD carriers having different sub-frame configurations, the aggregation of an FDD carrier and a TDD carrier, and the TDD sub-frame configuration dynamic reconfiguration.

An embodiment of the present invention provides a wireless communication method supporting HARQ, as shown in FIG. 1, where the method includes the following steps:

Step 101: Send first HARQ process quantity indication information to a UE.

In this step, the first HARQ process quantity indication information is used for performing data communication with a UE not adopting an advanced functional characteristic.

For an LTE system, the first HARQ process quantity indication information is sub-frame configuration information carried in a first system information block message. A base station may perform, by using the sub-frame configuration in the first system information block message, data communication with the UE not adopting an advanced functional characteristic. In an LTE TDD system, a network side notifies, through a first system information block broadcasted by the system, the user equipment of which one of 7 types of sub-frame configurations described in Table 1 is a to-be-used sub-frame configuration. For each type of sub-frame configurations described in Table 1, a protocol specifies a strict HARQ timing relationship (HARQ timing) and a corresponding HARQ process quantity. During implementation, the HARQ timing relationship and the HARQ process quantity corresponding to each type of sub-frame configurations may be stored in the base station and the UE in advance, and therefore, after obtaining the first HARQ process quantity indication information, the UE may determine a first HARQ process quantity corresponding to the first HARQ process quantity indication information.

When the first HARQ process quantity indication information is sent to the UE, the first HARQ process quantity indication information may be sent to all UEs. For example, in the LTE TDD system, the first HARQ process quantity indication information may be indicated through the sub-frame configuration information, and the sub-frame configuration information may be sent to all UEs by the base station through the broadcasted first system information block message. For example, if it is not in the LTE TDD system, the first HARQ process quantity indication information may not be sent to all UEs.

Step 102: If second HARQ process quantity indication information is further sent to the UE, determine a second HARQ process quantity according to the second HARQ process quantity indication information, and perform data transmission with the UE according to the determined second HARQ process quantity.

In this step, the second HARQ process quantity indication information is used for the UE to determine the HARQ process quantity used when the base station performs data communication with the UE.

Moreover, this embodiment may further include: if the second HARQ process quantity indication information is not sent to the UE, determining the first HARQ process quantity according to the first HARQ process quantity indication information, and performing data transmission with the UE according to the determined first HARQ process quantity.

In this step, the second HARQ process quantity indication information is mainly sent to the UEs adopting advanced functional characteristics, and therefore, the UEs adopting advanced functional characteristics may feed back an answer message to the base station according to a second HARQ timing relationship indicated by the second HARQ process quantity indication information.

For the UEs adopting advanced functional characteristics, the base station sets, according to the advanced functional characteristics adopted by the UEs, corresponding second HARQ process quantity indication information. For example, when the base station configures aggregation of TDD carriers having different sub-frame configurations for the UE, for downlink data transmission occurring on a secondary component carrier, when corresponding uplink answer information is fed back on a primary component carrier, it is required to take sub-frame configurations of the primary component carrier and secondary component carrier into comprehensive consideration to set appropriate second HARQ process quantity indication information, so that the UEs adopting advanced functional characteristics can perform data transmission according to an appropriate HARQ process quantity. For another example, when the base station enables a TDD sub-frame configuration dynamic reconfiguration function for the UE, the base station may communicate with the UE by using a sub-frame configuration X, where the sub-frame configuration X is variable in different wireless frames. For example, it may vary, according to a service requirement, within sub-frame configurations 0-6 described in Table 1, and in some wireless frames, the sub-frame configuration X may further be the same as the sub-frame configuration in the first system information block message. At this time, the base station needs to take all possible variations of the sub-frame configuration X into consideration to set the appropriate second HARQ process quantity indication information.

In this step, the second HARQ process quantity indication information may be notified to at least one UE through dedicated signaling or a specific system message. The dedicated signaling may include one or more of a radio resource control message, a medium access control message, physical-layer control signaling, and the like. For example, the UE adopting an advanced functional characteristic may be notified through the radio resource control message, and at this time, after sending the second HARQ process quantity indication information to the UE through the dedicated signaling, the base station receives an answer message fed back by the UE, so as to determine whether the sending is successful. If the base station successfully sends the second HARQ process quantity indication information to the UE, the base station performs data transmission with the UE according to the second HARQ process quantity; and when the base station does not successfully send the second HARQ process quantity indication information to the UE, the base station determines the first HARQ process quantity according to the first HARQ process quantity indication information, and performs data transmission with the UE according to the determined first HARQ process quantity. The specific system message may be an added system message used for notification, and may be broadcasted to a certain type of UEs, for example, a UE or an evolved UE adopting an advanced functional characteristic, and a UE beyond this type cannot receive or resolve the second HARQ process quantity indication information.

According to different application scenarios, the second HARQ process quantity indication information may have different specific designs, and the following further describes the specific designs of the second HARQ process quantity indication information through several application examples. The UE receiving the second HARQ process quantity indication information can determine the second HARQ process quantity according to the received second HARQ process quantity indication information, thereby being capable of performing data transmission according to the appropriate HARQ process quantity.

The LTE system is an ever-evolving system, and a base station supporting an advanced functional characteristic further needs to be capable of providing a service for a UE supporting only an early-version functional characteristic; and the evolved UE supporting an advanced functional characteristic also needs to be capable of accessing a base station supporting only an early-version functional characteristic and performing communication with the base station by using the early-version functional characteristic. To implement that an evolved base station is further capable of providing a service for the UE supporting only the early-version functional characteristic, preferably, when the base station performs data communication with the UE, for a UE to which the base station does not successfully send the second HARQ process quantity indication information, the base station performs data transmission with the UE based on the first HARQ process quantity indicated by the first HARQ process quantity indication information. In this way, after a non-evolved UE accesses an evolved base station, the evolved base station may provide a basic LTE communication service for the non-evolved UE by using the early-version functional characteristic; and after an evolved UE accesses a base station, no matter whether the base station is an evolved base station, when the base station sends only the first HARQ process quantity indication information but does not successfully send the second HARQ process quantity indication information to the evolved UE, the base station may provide a basic LTE communication service for the evolved UE by using the early-version functional characteristic.

When the second HARQ process quantity indication information is sent, the base station performs data transmission with the UE based on the second HARQ process quantity indicated according to the second HARQ process quantity indication information; and when the second HARQ process quantity indication information is not sent, the base station performs data transmission with the UE based on the first HARQ process quantity indicated according to the first HARQ process quantity indication information. Here, the first HARQ process quantity and the second HARQ process quantity may be the maximum number of downlink HARQ processes $M_{DL\_HARQ}$, and may also be the maximum number of uplink HARQ processes $M_{UL\_HARQ}$.

Moreover, the LTE TDD system defines, according to different UE capability levels, the total number of soft channel bits $N_{soft}$ supported by each UE capability level. The $N_{soft}$ provides a maximum soft buffer size supported by the UE, and the maximum soft buffer is further divided and then allocated to each HARQ process. A size of a soft buffer allocated to a transmission block is marked as $N_{IR}$ bits, and therefore $$N_{IR} = \left\lfloor \frac{N_{soft}}{K_C \cdot K_{MIMO} \cdot \min(M_{DL\_HARQ}, M_{limit})} \right\rfloor. \quad (1)$$

In Formula (1), $K_{MIMO}$ is the maximum number of transmission blocks supported by a physical downlink shared channel (PDSCH) transmission mode configured for the UE, and has a value of 1 or 2; $K_C$ is the maximum number of aggregated carriers supported by a capability level of the UE, and has a value of 1, 2, or 5; and $M_{limit}$ is a constant having a value of 8. In a sub-frame, the number of transmission blocks included in an HARQ process does not exceed $K_{MIMO}$. It may be seen from Formula (1) that, division of the soft buffer size may be related to the maximum number of downlink HARQ processes $M_{DL\_HARQ}$ supported by each sub-frame configuration, and a value of the $M_{DL\_HARQ}$ is obtained by the UE according to the sub-frame configuration notified in the SIB1.

In the embodiment of the present invention, when performing data transmission with the UE, the base station may further perform correct soft buffer size division according to the appropriate $M_{DL\_HARQ}$ determined according to the second HARQ process quantity indication information, for example, calculating a size of a downlink HARQ soft buffer by substituting the appropriate $M_{DL\_HARQ}$ determined according to the second HARQ process quantity indication information in Formula (1).

Further, when the base station determines the second HARQ process quantity according to the second HARQ process quantity indication information, before the base station performs data transmission with the UE, the method further includes:

sending downlink control information (Downlink Control Information, DCI) to the UE, where the number of HARQ processes carried in an HARQ process number field in the DCI is smaller than or equal to the second HARQ process quantity.

In the embodiment of the present invention, by sending the second HARQ process quantity indication information to the UE, the base station may perform data communication with the UE based on different HARQ timing relationships and HARQ process quantities, thereby being capable of better supporting UEs of different versions. Particularly, for UEs configured with one or more advanced functional characteristics such as the TDD sub-frame configuration dynamic reconfiguration, the aggregation of TDD carriers having different sub-frame configurations, and the aggregation of an FDD carrier and a TDD carrier, the UEs may perform data communication with the base station based on HARQ timing relationships different from the HARQ timing relationship corresponding to the sub-frame configuration notified through the SIB1 message on the carrier.

The following provides several exemplary examples of the second HARQ process quantity indication information by using the LTE system as an example.

The LTE system is an ever-developing and -evolving system, and includes two systems including FDD and TDD, and in an early version, a change of a TDD sub-frame configuration can be completed only through a system message update process, and is completed in 640 ms at fastest; however, the change of the sub-frame configuration usually causes service interruption in a period of time. To reduce an impact caused by the service interruption as much as possible, in an actual system, generally, the sub-frame configuration is rarely changed, and is even kept unchanged after network deployment is completed. Considering abruptness of uplink and downlink services, when the number of users is small, the sub-frame configuration needs to be capable of changing frequently and rapidly, so as to better match a current service traffic characteristic. Currently, an LTE protocol proposes support for changing a TDD sub-frame configuration more dynamically according to a current service characteristic, where the sub-frame configuration may often need to be changed every hundreds of milliseconds or even as short as every ten milliseconds, which is called TDD sub-frame configuration dynamic reconfiguration.

A method for implementing the TDD sub-frame configuration dynamic reconfiguration is: in each wireless frame, the base station sets a part of sub-frames as dynamic sub-frames (Flexible Sub-frame, or Dynamic Sub-frame) and notifies the UE of which sub-frames are set as the dynamic sub-frames. At each transmission moment, according to uplink and downlink service requirements of the user equipment, the dynamic sub-frames may be dynamically used by the base station for transmission of uplink data or downlink data. As shown in FIG. 2, the base station notifies the UE of a sub-frame configuration 1 through the SIB1; moreover, the base station may further notify, through a radio resource control (RRC) message, the UE that a sub-frame 3, a sub-frame 4, a sub-frame 8, and a sub-frame 9 are set as dynamic sub-frames, where D represents a downlink sub-frame, S represents a special sub-frame, U represents an uplink sub-frame, and F represents a dynamic sub-frame. For a dynamic sub-frame, the base station may indicate explicitly or implicitly, through signaling, for example, physical-layer signaling, whether each dynamic sub-frame is used for transmission of uplink data or downlink data.

Another method for implementing the TDD sub-frame configuration dynamic reconfiguration is: the base station further introduces new signaling, other than the sub-frame configuration notified through the SIB1, to notify the UE of an actually used sub-frame configuration X and effective time thereof, so that the UE understands when each sub-frame of each wireless frame is used for uplink data transmission and when it is used for downlink data transmission. As described in the foregoing, the sub-frame configuration notified through the SIB1 requires at least 640 ms for changing, and through the actually used sub-frame configuration X notified by the introduced new signaling, the base station may implement a rapid sub-frame configuration change without updating the system message, so as to implement the TDD sub-frame dynamic reconfiguration, thereby better matching uplink and downlink service requirements of the UE; that is, the sub-frame configuration X is set according to the uplink and downlink service requirements of the UE, and the base station performs communication with the UE by using the sub-frame configuration X, thereby implementing service transmission more efficiently. For example, as shown in FIG. 3, the sub-frame configuration notified through the SIB1 message is the sub-frame configuration 1, and the base station further notifies, through the RRC message, the UE of the actually used sub-frame configuration X and the effective time thereof, where, according to a service requirement of the UE, when the base station performs communication with the UE in different periods of time, the actually used sub-frame configuration X is sub-frame configurations 0, 2, 1, and 4 respectively.

Figure 5:
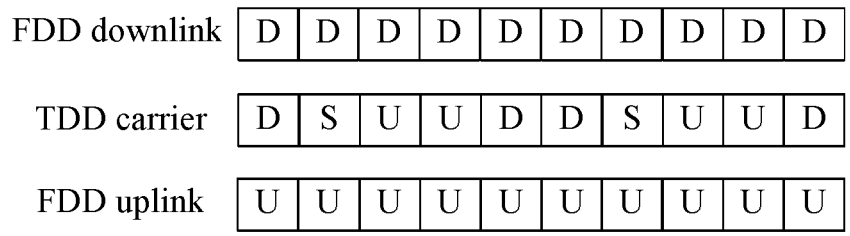
FIG. 5 is a schematic diagram of aggregation of FDD and TDD carriers according to an embodiment of the present invention.

A UE supporting a carrier aggregation technology may access more than one component carrier (Component Carrier) at the same time and perform data communication with the base station, and among the multiple component carriers, one is referred to as a primary component carrier, another component carrier is referred to as a secondary component carrier, and a component carrier is also generally referred to as a serving cell. An LTE version 10 supports aggregation of only TDD carriers having the same sub-frame configuration, but does not support aggregation of TDD carriers having different sub-frame configurations, or aggregation of an FDD carrier and a TDD carrier. An LTE version 11 proposes support for the aggregation of TDD carriers having different sub-frame configurations, as shown in FIG. 4; a subsequent evolved version may further support the aggregation of an FDD carrier and a TDD carrier, as shown in FIG. 5; in addition, in a carrier aggregation scenario, each TDD carrier may adopt the TDD sub-frame configuration dynamic reconfiguration technology.

In the carrier aggregation scenario, for example, the aggregation of TDD carriers having different sub-frame configurations or the aggregation of an FDD carrier and a TDD carrier, for at least one component carrier, the sending the first HARQ process quantity indication information to the UE specifically includes: sending first HARQ process quantity indication information related to the component carrier to the UE; and when the second HARQ process quantity indication information is successfully sent to the UE, the second HARQ process quantity indication information is second HARQ process quantity indication information related to the at least one component carrier, and is used for the UE to determine the second HARQ process quantity that can be supported when the base station performs data communication with the UE on the at least one component carrier. Further, the at least one component carrier may be: a component carrier enabling a TDD sub-frame configuration dynamic reconfiguration function, or a secondary component carrier having a sub-frame configuration different from that of the primary component carrier. It should be noted that, the FDD carrier and the TDD carrier are also carriers adopting different sub-frame configurations.

Moreover, the base station may perform communication with the UE by using multiple component carriers at the same time, the multiple component carriers include the primary component carrier, and the rest is the secondary component carrier, where one or more secondary component carriers may have a sub-frame configuration different from that of the primary component carrier, and the TDD sub-frame configuration dynamic reconfiguration function may be further enabled on at least one component carrier. For the secondary component carrier having a sub-frame configuration different from that of the primary component carrier, and/or the component carrier enabling the TDD sub-frame configuration dynamic reconfiguration function, the base station may send, to each component carrier, first HARQ process quantity indication information related to the component carrier and second HARQ process quantity indication information related to the component carrier, and may also notify the same second HARQ process quantity indication information for all component carriers.

Example 1

The second HARQ process quantity indication information includes the second HARQ process quantity. At this time, the determining the second HARQ process quantity according to the second HARQ process quantity indication information includes: determining the second HARQ process quantity included in the second HARQ process quantity indication information as the second HARQ process quantity.

Example 2

The second HARQ process quantity indication information may include sub-frame configuration information. At this time, the determining the second HARQ process quantity according to the second HARQ process quantity indication information includes: determining the second HARQ process quantity according to the sub-frame configuration information included in the second HARQ process quantity indication information. The sub-frame configuration information is further used to indicate, to the UE, an HARQ timing relationship according to which when the base station performs data communication with the UE. Therefore, the UE may determine the second HARQ process quantity according to the sub-frame configuration information, and may further determine, according to the sub-frame configuration information, the HARQ timing relationship according to which when data communication is performed with the base station.

The LTE system supports the physical-layer HARQ technology, where, for each data transmission, a data receiver needs to feed back answer information to a data sender, so as to determine whether data is received correctly. In the LTE system, for downlink data transmission, the HARQ timing relationship refers to a timing relationship between the downlink data transmission and uplink answer information transmission, that is, on which sub-frame does the uplink answer information transmission appear after the downlink data transmission; and for uplink data transmission, the HARQ timing relationship includes: a timing relationship between the uplink data transmission and downlink answer information transmission, and a timing relationship between the downlink answer information transmission and uplink data retransmission.

For example, when the base station configures the aggregation of TDD carriers having different sub-frame configurations for the UE, assume that the primary component carrier adopts the sub-frame configuration 1, the secondary component carrier adopts a sub-frame configuration 3, and the base station performs data communication with the UE on the secondary component carrier by using the sub-frame configuration 3. For downlink data transmission occurring on the secondary component carrier, corresponding uplink answer information is fed back on the primary component carrier, and when an HARQ timing relationship specified for the sub-frame configuration 3 is used continuously, the uplink answer information related to the secondary component carrier to be fed back on the sub-frame 4 cannot be fed back, because the sub-frame 4 is a downlink sub-frame on the primary component carrier. To solve the problem, for a secondary component carrier having a sub-frame configuration different from the sub-frame configuration of the primary component carrier, sub-frame configuration information may be additionally notified for the UE. For example, the added sub-frame configuration information indicates a sub-frame configuration 5, which is used to indicate, to the UE, an HARQ timing relationship according to which when the base station performs downlink data communication with the UE on the secondary component carrier, and according to the HARQ timing relationship specified by the sub-frame configuration 5, all uplink answer information is fed back on the sub-frame 2, and the sub-frame 2 on the primary component carrier is also an uplink sub-frame, thereby avoiding a problem that the uplink answer information of the downlink data transmission on the secondary component carrier cannot be fed back on the primary component carrier.

For another example, when the base station enables the TDD sub-frame configuration dynamic reconfiguration function for the UE, for example, as shown in FIG. 2, the base station notifies the UE of the sub-frame configuration 1 through the SIB1, and notifies, through the RRC message, the UE that the sub-frame 3, the sub-frame 4, the sub-frame 8, and the sub-frame 9 are set as the dynamic sub-frames, and each dynamic sub-frame may be dynamically used for downlink data transmission (that is, used as a downlink sub-frame) or uplink data transmission (that is, used as an uplink sub-frame) according to a service requirement. Still using the downlink data transmission as an example, according to the HARQ timing relationship specified by the sub-frame configuration 1, the sub-frame 3 and the sub-frame 8 cannot be dynamically used as downlink sub-frames because uplink answer information needs to be fed back, although the sub-frame 3 and the sub-frame 8 may not have any uplink data at this time, and therefore, gain brought by dynamic sub-frame reconfiguration cannot be fully obtained. To solve the problem, the base station may additionally notify the UE of sub-frame configuration information. For example, the added sub-frame configuration information indicates a sub-frame configuration 2, which is used to indicate, to the UE, an HARQ timing relationship according to which when the base station performs downlink data communication with the UE, and according to the HARQ timing relationship specified by the sub-frame configuration 2, all uplink answer information is fed back on the sub-frame 2 and the sub-frame 7, without feeding back on the dynamic sub-frame, thereby ensuring that the dynamic sub-frame can be dynamically used for downlink data transmission or uplink data transmission totally according to uplink and downlink service requirements.

It should be noted that, in the foregoing example, different sub-frame configurations may be notified for the downlink data transmission and uplink data transmission respectively, which are used to indicate the HARQ timing relationship for the downlink data transmission and the HARQ timing relationship for the uplink data transmission respectively.

It may be seen that, other than the existing sub-frame configuration notified through the SIB1, and the sub-frame configuration (determined according to a use condition of the dynamic sub-frame or directly notified by the base station through newly introduced signaling) actually used in the TDD sub-frame configuration dynamic reconfiguration, the notified sub-frame configuration information is newly added for the UE and used to indicate, to the UE, the HARQ timing relationship according to which when the base station performs data communication with the UE, which may better support the UE in performing communication with the base station by adopting the advanced functional characteristic.

Preferably, the sub-frame configuration information is one of sub-frame configurations described in Table 1. At this time, the sub-frame configuration corresponding to the newly added sub-frame configuration information may be different from the sub-frame configuration notified in the SIB1 (that is, the sub-frame configuration indicated in the first HARQ process quantity indication information), and may also be the same as the sub-frame configuration notified in the SIB1, where a difference lies in that the newly added sub-frame configuration information is used to indicate, to the UE, the HARQ timing relationship according to which when the base station performs data communication with the UE, and determine the second HARQ process quantity when data communication is performed with the UE. At this time, the sub-frame configuration actually used when the base station performs data communication with the UE may be the sub-frame configuration notified in the SIB1, or the sub-frame configuration actually used in the TDD sub-frame configuration dynamic reconfiguration. It may be seen that, the sub-frame configuration information included in the second HARQ process quantity indication information is used to indicate, to the UE, the HARQ timing relationship according to which when the base station performs data communication with the UE instead of being used to indicate the sub-frame configuration actually used in the data transmission, and the sub-frame configuration notified through the SIB1 (that is, the first HARQ process quantity indication information) is used to provide backward compatibility for an early-version UE and perform data communication with an evolved UE not adopting an advanced functional characteristic. Therefore, the sub-frame configuration information included in the second HARQ process quantity indication information in the embodiment of the present invention has an objective and usage different from those of the first HARQ process quantity indication information.

In this embodiment, by notifying the sub-frame configuration information included in the second HARQ process quantity indication information, the UE determines, when the actual sub-frame configuration can be changed, an HARQ timing relationship that is independent from the actually used sub-frame configuration, thereby better supporting the UE in performing communication with the base station by adopting the advanced functional characteristic. In a case that the TDD sub-frame configuration dynamic reconfiguration is adopted, the base station indicates three types of sub-frame configuration information to the UE in total, where one is the sub-frame configuration notified through the SIB1 (that is, the first HARQ process quantity indication information), one is the sub-frame configuration actually used in data transmission, and another is the sub-frame configuration information included in the second HARQ process quantity indication information described in the embodiment of the present invention. The sub-frame configuration notified through the SIB1 is used to provide backward compatibility for the early-version UE and perform data communication with the evolved UE not adopting the advanced functional characteristic, the sub-frame configuration actually used in data transmission is used to determine whether each sub-frame in the wireless frame is used for uplink data transmission or downlink data transmission, and the second sub-frame configuration information included in the second HARQ process quantity indication information is used to indicate, to the UE, the HARQ timing relationship according to which when the base station performs data communication with the UE. At this time, the base station and the UE may both perform data communication with help of the HARQ timing relationship corresponding to the sub-frame configuration indicated by the sub-frame configuration information included in the second HARQ process quantity indication information and the HARQ process quantity. For example: for the TDD sub-frame configuration dynamic reconfiguration, by using FIG. 2 as an example, the SIB1 notifies the sub-frame configuration 1, that is, "DSUUDDSUUD", and the UE is further notified, through the RRC message, that the sub-frame 3, the sub-frame 4, the sub-frame 8, and the sub-frame 9 are set as the dynamic sub-frames. At this time, a PDSCH HARQ design needs to consider an extreme case that all dynamic sub-frames are used for downlink service transmission, that is, "DSUDDDSUDD". The base station may notify, through the RRC message, the UE that the second HARQ process quantity indication information is used for PDSCH HARQ, where the second HARQ process quantity indication information indicates the sub-frame configuration 2, that is, "DSUDDDSUDD". By using FIG. 3 as an example, the SIB1 notifies the sub-frame configuration 1, and the UE is further notified, through the RRC message, that sub-frame configurations actually used in data transmission are the sub-frame configuration 0, the sub-frame configuration 2, the sub-frame configuration 1, and the sub-frame configuration 4 in sequence. At this time, the PDSCH HARQ design needs to consider all possible actually used sub-frame configurations, that is, PDSCH HARQ after taking the sub-frame configuration 0, the sub-frame configuration 2, the sub-frame configuration 1, and the sub-frame configuration 4 into comprehensive consideration, and the UE may be notified, through the RRC message, that the second HARQ process quantity indication information is used for the PDSCH HARQ, where the second HARQ process quantity indication information indicates the sub-frame configuration 5. For the aggregation of TDD carriers having different sub-frame configurations, by using FIG. 4 as an example, the primary component carrier uses the sub-frame configuration 2, the secondary component carrier uses the sub-frame configuration 1, and for PDSCH transmission on the secondary component carrier, uplink answer information thereof is transmitted on the primary component carrier. At this time, the UE may be notified, through the RRC message, that the sub-frame configuration 5 is used for secondary component carrier PDSCH HARQ, that is, at this time, for the secondary component carrier, the base station may notify the UE that the first HARQ process quantity indication information of the secondary component carrier is the sub-frame configuration 1, and notify, through the RRC message, the UE that the sub-frame configuration information included in the second HARQ process quantity indication information of the secondary component carrier is the sub-frame configuration 5. Similarly, for the aggregation of an FDD carrier and a TDD carrier, for example, the FDD carrier is the primary component carrier, the TDD carrier is the secondary component carrier, and for the secondary component carrier, the base station may also notify, through the RRC message, the UE that the sub-frame configuration 0 is used for the secondary component carrier PDSCH HARQ, that is, the second sub-frame configuration information of the secondary component carrier is the sub-frame configuration 0.

It may be seen that, other than the sub-frame configuration notified through the system message, and the sub-frame configuration actually used in data transmission in the TDD sub-frame configuration dynamic reconfiguration, through the sub-frame configuration information included in the second HARQ process quantity indication information notified by the base station and newly added for the UE, the base station may perform data transmission with the UE based on the HARQ timing relationship corresponding to the sub-frame configuration included in the second HARQ process quantity indication information and the corresponding second HARQ process quantity, thereby effectively supporting the TDD sub-frame configuration dynamic reconfiguration, aggregation of carriers having different sub-frame configurations, and aggregation of an FDD carrier and a TDD carrier.

It should be noted that, although this example analyzes the function and effect of the sub-frame configuration information only for the sub-frame configuration information included in the second HARQ process quantity indication information, when the second HARQ process quantity indication information includes an implementation manner in another example of the embodiment of the present invention, the function and effect thereof are the same as those of the sub-frame configuration information, and are not repeatedly described herein.

Example 3

The second HARQ process quantity indication information includes an HARQ timing relationship. At this time, the determining the second HARQ process quantity according to the second HARQ process quantity indication information includes: determining the second HARQ process quantity according to the HARQ timing relationship included in the second HARQ process quantity indication information. The HARQ timing relationship is used to indicate, to the UE, an HARQ timing relationship used when the base station performs data communication with the UE. In addition to notifying the UE of the sub-frame configuration information so that the UE determines the corresponding HARQ timing relationship and the second HARQ process quantity according to the sub-frame configuration information, in this example, the base station may also directly notify the UE of the HARQ timing relationship, so that the UE determines the second HARQ process quantity according to the notified HARQ timing relationship. By using the aggregation of an FDD carrier and a TDD carrier as an example, in which the FDD carrier is the primary component carrier, and the TDD carrier is the secondary component carrier, the base station may notify, through the RRC message, the UE that the HARQ timing relationship satisfied by the TDD carrier PDSCH HARQ is: for PDSCH transmission occurring on a sub-frame n, uplink answer information is fed back on a sub-frame n+4, that is, the uplink answer information transmission occurs on the 4$^{th}$ sub-frame after the PDSCH transmission.

Example 4

The second HARQ process quantity indication information includes TDD sub-frame configuration dynamic reconfiguration enable information, configuration information of aggregation of TDD carriers having different sub-frame configurations, or configuration information of aggregation of an FDD carrier and a TDD carrier.

When the second HARQ process quantity indication information is the TDD sub-frame configuration dynamic reconfiguration enable information, the TDD sub-frame configuration dynamic reconfiguration enable information is information notifying the UE of enabling TDD sub-frame configuration dynamic reconfiguration. In this example, the TDD sub-frame configuration dynamic reconfiguration enable information may be notified through independent signaling, and the TDD sub-frame configuration dynamic reconfiguration enable information may be represented by using signaling existing in the prior art. For example, dynamic sub-frame setting information may be used to represent enabling the TDD sub-frame configuration dynamic reconfiguration, and when the UE receives the dynamic sub-frame setting information, the UE may know that the TDD sub-frame configuration dynamic reconfiguration has been enabled; or, other than the sub-frame configuration notified through the system message, additional sub-frame configuration information that is actually used by data transmission and notified through new signaling may be used to represent enabling the TDD sub-frame configuration dynamic reconfiguration (that is, the signaling used to notify the sub-frame configuration X actually used by the data transmission in the foregoing another method for implementing the TDD sub-frame configuration dynamic reconfiguration). At this time, the determining the second HARQ process quantity according to the second HARQ process quantity indication information includes: determining the second HARQ process quantity as a predefined value according to the second HARQ process quantity indication information. Preferably, the predefined value is larger than or equal to 8, or is equal to 4. A predefined value in the following is the same as the predefined value here, and is not repeatedly described. Because $M_{limit}$ is a constant having a value of 8, at this time, formula (1) may be further simplified. For example, when the predefined value is 8, that is, $M_{DL\_HARQ}=8$, formula (1) may be simplified as $$N_{IR} = \left\lfloor \frac{N_{soft}}{K_C \cdot K_{MIMO} \cdot 8} \right\rfloor. \quad (2)$$

Or
when the second HARQ process quantity indication information includes the TDD sub-frame configuration dynamic reconfiguration enable information, the TDD sub-frame configuration dynamic reconfiguration enable information includes the dynamic sub-frame setting information or the sub-frame configuration information actually used in the data transmission, and the determining the second HARQ process quantity according to the second HARQ process quantity indication information may include: determining, according to the dynamic sub-frame setting information or a combination of the sub-frame configuration information actually used in the data transmission included in the TDD sub-frame configuration dynamic reconfiguration enable information, the second HARQ process quantity by searching for pre-stored correspondence between the second HARQ process quantity and all supported dynamic sub-frame settings or searching for pre-stored correspondence between the second HARQ process quantity and all combinations of possibly used sub-frame configuration information. The combination of the sub-frame configuration information actually used in the data transmission includes: sub-frame configuration information included in the combination of the possibly used sub-frame configuration or sub-frame configuration information of an actually used sub-frame configuration. The second HARQ process quantity includes the maximum number of downlink HARQ processes and/or the maximum number of uplink HARQ processes. The correspondence may be stored in the base station and UE through a predefined table. In the protocol, a table may be predefined, where all supported dynamic sub-frame settings are listed in the table, and a supported second HARQ process quantity is specified for each type of dynamic sub-frame settings. For example, for the dynamic sub-frame setting shown in FIG. 2, that is, the sub-frame 3, the sub-frame 4, the sub-frame 8, and the sub-frame 9 are set as the dynamic sub-frames, it may be specified in the table that the maximum number of downlink HARQ processes is 10, and the maximum number of uplink HARQ processes is 7. Or, in the protocol, a table may be predefined, where all combinations of possibly used sub-frame configurations are listed in the table, and a supported second HARQ process quantity is specified for each type of combinations of possibly used sub-frame configurations. For example, for a combination of sub-frame configurations shown in FIG. 3, that is, the actually used sub-frame configuration X may be a combination of the sub-frame configuration 0, the sub-frame configuration 1, the sub-frame configuration 2, and the sub-frame configuration 4, and it may be specified in the table that the maximum number of downlink HARQ processes is 15, and the maximum number of uplink HARQ processes is 7. The combination of all possibly used sub-frame configurations that is notified in the TDD sub-frame configuration dynamic reconfiguration enable information may directly be sub-frame configuration information included in all the possibly used sub-frame configurations, and may also be an index of a combination of actually used sub-frame configurations, and sub-frame configuration information included in the combination may be obtained through the index. All the possibly used sub-frame configurations constitute the combination of all possibly used sub-frame configurations, and the combination of all possibly used sub-frame configurations is corresponding to a second HARQ process quantity. A meaning of a combination in this specification is similar to this.

When the second HARQ process quantity indication information includes the configuration information of aggregation of TDD carriers having different sub-frame configurations, the second HARQ process quantity is an HARQ process quantity of the secondary component carrier, the configuration information of aggregation of TDD carriers having different sub-frame configurations includes a sub-frame configuration of a primary component carrier and a sub-frame configuration of the secondary component carrier, and the determining the second HARQ process quantity according to the second HARQ process quantity indication information may include: determining the HARQ process quantity of the secondary component carrier as a predefined value according to the configuration information of aggregation of TDD carriers having different sub-frame configurations, where the secondary component carrier has the sub-frame configuration different from that of the primary component carrier.

Or when the second HARQ process quantity indication information includes the configuration information of aggregation of TDD carriers having different sub-frame configurations, the second HARQ process quantity is the HARQ process quantity of the secondary component carrier, the configuration information of aggregation of TDD carriers having different sub-frame configurations includes the sub-frame configuration of the primary component carrier and the sub-frame configuration of the secondary component carrier, and the determining the second HARQ process quantity according to the second HARQ process quantity indication information may include: determining, according to the configuration information of aggregation of TDD carriers having different sub-frame configurations, the HARQ process quantity of the secondary component carrier to be the same as the HARQ process quantity of the primary component carrier, or determining the HARQ process quantity of the secondary component carrier as a larger one of the HARQ process quantity of the primary component carrier and the HARQ process quantity of the secondary component carrier, or determining the HARQ process quantity of the secondary component carrier as a smaller one of the HARQ process quantity of the primary component carrier and the HARQ process quantity of the secondary component carrier, where the secondary component carrier has the sub-frame configuration different from that of the primary component carrier, the HARQ process quantity of the primary component carrier is an HARQ process quantity determined according to the sub-frame configuration of the primary component carrier, and the HARQ process quantity of the secondary component carrier is an HARQ process quantity determined according to the sub-frame configuration of the secondary component carrier. The configuration information of aggregation of TDD carriers having different sub-frame configurations includes the sub-frame configuration of the primary component carrier and the sub-frame configuration of the secondary component carrier.

Or when the second HARQ process quantity indication information includes the configuration information of aggregation of TDD carriers having different sub-frame configurations, the second HARQ process quantity is the HARQ process quantity of the secondary component carrier. The determining the second HARQ process quantity according to the second HARQ process quantity indication information may include: determining, according to the sub-frame configuration of the primary component carrier and sub-frame configuration of the secondary component carrier included in the configuration information of aggregation of TDD carriers having different sub-frame configurations, the HARQ process quantity of the secondary component carrier by searching for the correspondence between the second HARQ process quantity and all supported combinations of the sub-frame configuration of the primary component carrier and the sub-frame configuration of the secondary component carrier, where the secondary component carrier has the sub-frame configuration different from that of the primary component carrier. In the protocol, the correspondence may be a predefined table, where all supported combinations of the sub-frame configuration of the primary component carrier and the sub-frame configuration of the secondary component carrier are listed in the table, and an HARQ process quantity supported on the secondary component carrier is specified for each type of combinations of the sub-frame configurations. The correspondence may be stored in the base station and UE in advance. The HARQ process quantity supported on the secondary component carrier includes the maximum number of downlink HARQ processes and/or the maximum number of uplink HARQ processes. For example, it may be specified in the table that when the sub-frame configuration of the primary component carrier is the sub-frame configuration 2 and the sub-frame configuration of the secondary component carrier is the sub-frame configuration 4, the maximum number of downlink HARQ processes of the secondary component carrier is 15, and the maximum number of uplink HARQ processes of the secondary component carrier is 4. When multiple secondary component carriers have sub-frame configurations different from that of the primary component carrier, for each secondary component carrier, the supported HARQ process quantity may be obtained, by looking up the table, according to the combination of the sub-frame configuration thereof and the sub-frame configuration of the primary component carrier. In all the foregoing supported combinations of the sub-frame configuration of the primary component carrier and the sub-frame configuration of the secondary component carrier, data transmission and answer information feedback may be performed on different component carriers respectively in the aggregation of TDD carriers having different sub-frame configurations. For example, for downlink data transmission occurring on the secondary component carrier, corresponding uplink answer information is fed back on the primary component carrier. Therefore, a setting of the second HARQ process quantity needs to take the sub-frame configurations of the primary component carrier and the secondary component carrier into comprehensive consideration.

When the second HARQ process quantity indication information includes the configuration information of aggregation of an FDD carrier and a TDD carrier, the second HARQ process quantity is the HARQ process quantity of the secondary component carrier, and the determining the second HARQ process quantity according to the second HARQ process quantity indication information may include: determining the HARQ process quantity of the secondary component carrier as a predefined value according to the configuration information of aggregation of an FDD carrier and a TDD carrier.

Or when the second HARQ process quantity indication information is the configuration information of aggregation of an FDD carrier and a TDD carrier, the second HARQ process quantity is the HARQ process quantity of the secondary component carrier, the configuration information of aggregation of an FDD carrier and a TDD carrier includes a sub-frame configuration of the TDD carrier, and the determining the HARQ process quantity according to the second HARQ process quantity indication information may include: determining the HARQ process quantity of the secondary component carrier as a larger one of an HARQ process quantity of the FDD carrier and an HARQ process quantity determined according to the sub-frame configuration of the TDD carrier, or determining the HARQ process quantity of the secondary component carrier as a smaller one of the HARQ process quantity of the FDD carrier and the HARQ process quantity determined according to the sub-frame configuration of the TDD carrier. Or, when the second HARQ process quantity indication information is the configuration information of aggregation of an FDD carrier and a TDD carrier, the determining the HARQ process quantity according to the second HARQ process quantity indication information may include: according to the configuration information of the aggregation of an FDD carrier and a TDD carrier, when the secondary component carrier is the TDD carrier, determining the HARQ process quantity of the secondary component carrier as the HARQ process quantity of the FDD carrier, and when the secondary component carrier is the FDD carrier, determining the HARQ process quantity of the secondary component carrier as the HARQ process quantity determined according to the sub-frame configuration of the TDD carrier. Because the HARQ process quantity of the FDD carrier is fixed, the HARQ process quantity of the FDD carrier may be directly determined.

In the embodiment of the present invention, by sending the second HARQ process quantity indication information to the UE, the base station can perform data communication with the UE based on different HARQ timing relationships and HARQ process quantities, thereby being capable of better supporting UEs adopting different functional characteristics. Particularly, for the UEs configured with the advanced functional characteristics such as the TDD sub-frame configuration dynamic reconfiguration, aggregation of TDD carriers having different sub-frame configurations, and aggregation of an FDD carrier and a TDD carrier, the base station may perform data communication more effectively with the UEs configured with the advanced functional characteristics by using the HARQ timing relationship different from the HARQ timing relationship corresponding to the sub-frame configuration notified through the SIB1 message on the carrier.

Figure 6:
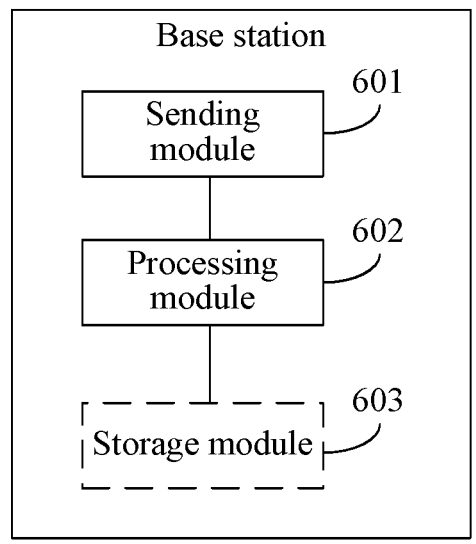
FIG. 6 is a schematic structural diagram of a base station according to an embodiment of the present invention.

This embodiment further provides a base station, where the base station may execute the wireless communication method supporting HARQ according to the foregoing embodiment of the present invention. As shown in FIG. 6, the base station includes: a sending module 601 and a processing module 602.

The sending module 601 is configured to send first HARQ process quantity indication information to a UE; and the processing module 602 is configured to, if the sending module 601 further sends second HARQ process quantity indication information to the UE, determine a second HARQ process quantity according to the second HARQ process quantity indication information, and perform data transmission with the UE through the sending module 601 according to the determined second HARQ process quantity.

The processing module 602 is further configured to, if the sending module 601 does not send the second HARQ process quantity indication information to the UE, determine a first HARQ process quantity according to the first HARQ process quantity indication information, and perform data transmission with the UE through the sending module 601 according to the determined first HARQ process quantity.

In this embodiment, the second HARQ process quantity determined by the processing module 602 is the maximum number of downlink HARQ processes $M_{DL\_HARQ}$, or the maximum number of uplink HARQ processes $M_{UL\_HARQ}$, and the processing module is further configured to calculate a size of an HARQ soft buffer and divide the soft buffer according to the maximum number of downlink HARQ processes $M_{DL\_HARQ}$, and perform data transmission with the UE based on the divided soft buffer and the second HARQ process quantity.

In a carrier aggregation scenario, the sending module 601 is specifically configured to, for at least one component carrier, send the first HARQ process quantity indication information of the at least one component carrier to the UE; and when the second HARQ process quantity indication information is further sent, send the second HARQ process quantity indication information of the at least one component carrier to the UE; and the processing module, when performing data transmission with the UE, performs, according to the second HARQ process quantity, data transmission with the UE on the at least one component carrier, where:

the at least one component carrier is: a component carrier enabling a time division duplex TDD sub-frame configuration dynamic reconfiguration function, or a secondary component carrier having a sub-frame configuration different from that of a primary component carrier.

In this embodiment, for aggregation of carriers having different sub-frame configurations, when performing communication with the UE on multiple carriers at the same time, the sending module 601 is specifically configured to, for each secondary component carrier, send the second HARQ process quantity indication information of each secondary component carrier to the UE, where the secondary component carrier has the sub-frame configuration different from that of the primary component carrier.

The sending module 601 is specifically configured to send the first HARQ process quantity indication information to the UE through a first system information block message, where the first HARQ process quantity indication information is sub-frame configuration information in the first system information block message, which is the same in the following and is not repeatedly described.

Optionally, the second HARQ process quantity indication information sent by the sending module 601 includes the second HARQ process quantity, and the processing module 602 is specifically configured to, determine the second HARQ process quantity included in the second HARQ process quantity indication information as the second HARQ process quantity; or the second HARQ process quantity indication information sent by the sending module 601 includes an HARQ timing relationship, and the processing module 602 is specifically configured to determine the second HARQ process quantity according to the HARQ timing relationship included in the second HARQ process quantity indication information; or the second HARQ process quantity indication information sent by the sending module 601 includes sub-frame configuration information, and the processing module 602 is specifically configured to determine the second HARQ process quantity according to the sub-frame configuration information included in the second HARQ process quantity indication information; or the second HARQ process quantity indication information sent by the sending module 601 includes time division duplex TDD sub-frame configuration dynamic reconfiguration enable information; at this time, the base station further includes a storage module 603, configured to store a value predefined for the second HARQ process quantity; the processing module 602 is specifically configured to determine, according to the TDD sub-frame configuration dynamic reconfiguration enable information, the second HARQ process quantity as the predefined value stored in the storage module 603; or, the TDD sub-frame configuration dynamic reconfiguration enable information sent by the sending module 601 includes dynamic sub-frame setting information, and the base station further includes the storage module 603, configured to store correspondence between the second HARQ process quantity and all supported dynamic sub-frame settings; the processing module 602 is specifically configured to determine, according to the dynamic sub-frame setting information included in the TDD sub-frame configuration dynamic reconfiguration enable information, the second HARQ process quantity by searching for the correspondence between the second HARQ process quantity and all the supported dynamic sub-frame settings that is stored in the storage module 603; or, the TDD sub-frame configuration dynamic reconfiguration enable information sent by the sending module 601 includes a combination of sub-frame configuration information actually used in data transmission, and the base station further includes the storage module 603, configured to store correspondence between the second HARQ process quantity and all combinations of possibly used sub-frame configuration information; the processing module 602 is specifically configured to determine, according to the combination of sub-frame configuration information actually used in data transmission and included in the TDD sub-frame configuration dynamic reconfiguration enable information, the second HARQ process quantity by searching for the correspondence between the second HARQ process quantity and all combinations of possibly used sub-frame configuration information that is stored in the storage module 603;

or the second HARQ process quantity indication information sent by the sending module 601 includes configuration information of aggregation of TDD carriers having different sub-frame configurations, the second HARQ process quantity is the HARQ process quantity of the secondary component carrier, the configuration information of aggregation of TDD carriers having different sub-frame configurations includes the sub-frame configuration of the primary component carrier and the sub-frame configuration of the secondary component carrier, the secondary component carrier has the sub-frame configuration different from that of the primary component carrier, and the processing module 602 is specifically configured to determine, according to the configuration information of aggregation of TDD carriers having different sub-frame configurations, the HARQ process quantity of the secondary component carrier as the predefined value stored in the storage module 603, and at this time, the base station further includes the storage module 603, configured to store the value predefined for the second HARQ process quantity; or, determine the process quantity of the secondary component carrier as an HARQ process quantity determined according to the sub-frame configuration of the primary component carrier; or, determine the HARQ process quantity of the secondary component carrier as a larger one of the HARQ process quantity determined according to the sub-frame configuration of the primary component carrier and the HARQ process quantity determined according to the sub-frame configuration of the secondary component carrier; or, determine the HARQ process quantity of the secondary component carrier as a smaller one of the HARQ process quantity determined according to the sub-frame configuration of the primary component carrier and the HARQ process quantity determined according to the sub-frame configuration of the secondary component carrier; or, determine, according to the sub-frame configuration of the primary component carrier and the sub-frame configuration of the secondary component carrier included in the configuration information of aggregation of TDD carriers having different sub-frame configurations, the HARQ process quantity of the secondary component carrier by searching for of the correspondence between the second HARQ process quantity and all supported combinations of the sub-frame configuration of the primary component carrier and the sub-frame configuration of the secondary component carrier that is stored in the storage module 603, and at this time, the base station further includes the storage module 603, configured to store the correspondence between the second HARQ process quantity and all supported combinations of the sub-frame configuration of the primary component carrier and the sub-frame configuration of the secondary component carrier;

or the second HARQ process quantity indication information sent by the sending module 601 includes configuration information of aggregation of an FDD carrier and a TDD carrier, the second HARQ process quantity is the HARQ process quantity of the secondary component carrier, the configuration information of aggregation of an FDD carrier and a TDD carrier includes a sub-frame configuration of the TDD carrier, and the processing module 602 is specifically configured to determine, according to the configuration information of aggregation of an FDD carrier and a TDD carrier, the HARQ process quantity of the secondary component carrier as the predefined value stored in the storage module 603, and at this time, the base station further includes the storage module 603, configured to store the value predefined for the second HARQ process quantity; or, determine the HARQ process quantity of the secondary component carrier as a larger one of an HARQ process quantity of the FDD carrier and an HARQ process quantity determined according to the sub-frame configuration of the TDD carrier; or, determine the HARQ process quantity of the secondary component carrier as a smaller one of the HARQ process quantity of the FDD carrier and the HARQ process quantity determined according to the sub-frame configuration of the TDD carrier; or, when the secondary component carrier is the TDD carrier, determine the HARQ process quantity of the secondary component carrier as the HARQ process quantity of the FDD carrier, and when the secondary component carrier is the FDD carrier, determine the HARQ process quantity of the secondary component carrier as the HARQ process quantity determined according to the sub-frame configuration of the TDD carrier.

Preferably, the predefined value stored in the storage module 603 is larger than or equal to 8, or is equal to 4.

Preferably, the sub-frame configuration information is one of 7 types of sub-frame configurations described in Table 1.

It should be noted that, the modules of the base station execute content such as information interaction and an execution process in the method according to one aspect of the embodiment of the present invention. Specifically, reference may be made to the description of the method embodiment. Moreover, this embodiment of the base station is based on the same idea as the method embodiment according to the foregoing one aspect, and a technical effect brought thereby is the same as that of the method embodiment of the present invention. For specific content, reference may be made to the description in the method embodiment of the present invention, which is not repeatedly described herein.

Figure 7:
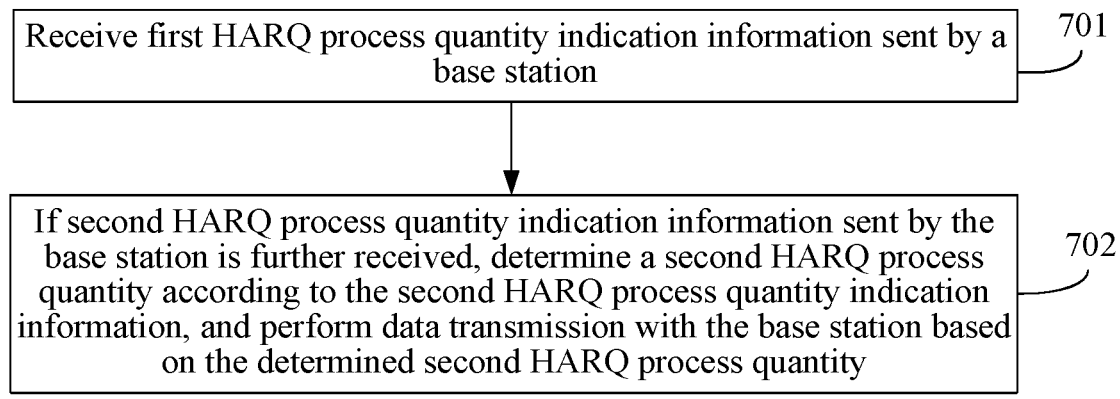
FIG. 7 is a flowchart of a wireless communication method supporting HARQ according to another embodiment of the present invention.

In another aspect, another embodiment of the present invention further provides a wireless communication method supporting HARQ. As shown in FIG. 7, the method includes the following steps:

Step 701: Receive first HARQ process quantity indication information sent by a base station.

In this step, the first HARQ process quantity indication information is to-be-used sub-frame configuration carried in a first system information block message.

Step 702: If second HARQ process quantity indication information sent by the base station is further received, determine a second HARQ process quantity according to the second HARQ process quantity indication information, and perform data transmission with the base station based on the determined second HARQ process quantity.

This embodiment may further include: when the second HARQ process quantity indication information sent by the base station is not received, determining a first HARQ process quantity according to the first HARQ process quantity indication information, and performing data transmission with the base station according to the determined first HARQ process quantity.

For the second HARQ process quantity indication information, reference may be made to the description in the foregoing embodiment, and for how to determine the second HARQ process quantity according to the second HARQ process quantity indication information, reference may also be made to the corresponding description in the foregoing embodiment, which are not repeatedly described herein.

In this embodiment, the second HARQ process quantity is the maximum number of downlink HARQ processes $M_{DL\_HARQ}$, or the maximum number of uplink HARQ processes $M_{UL\_HARQ}$, and before performing data transmission with the base station, the method of this embodiment may further include: calculating a size of an HARQ soft buffer and dividing the soft buffer according to the maximum number of downlink HARQ processes $M_{DL\_HARQ}$; and the performing data transmission with the base station according to the determined second HARQ process quantity specifically includes performing data transmission with the base station according to the divided soft buffer and the second HARQ process quantity.

In this embodiment, in a carrier aggregation scenario, the receiving the first HARQ process quantity indication information and the receiving the second HARQ process quantity indication information include:

in the carrier aggregation scenario, for at least one component carrier, the first HARQ process quantity indication information is the first HARQ process quantity indication information of the at least one component carrier, and the second HARQ process quantity indication information is the second HARQ process quantity indication information of the at least one component carrier;

when performing data transmission with the base station, performing, according to the second HARQ process quantity, data transmission with the base station on the component carrier, where:

the at least one component carrier is: a component carrier enabling a time division duplex TDD sub-frame configuration dynamic reconfiguration function, or a secondary component carrier having a sub-frame configuration different from that of a primary component carrier.

In the embodiment of the present invention, by receiving the second HARQ process quantity indication information sent by the base station, the UE can perform data communication with the base station by using different HARQ timing relationships and HARQ process quantities.

In addition, in an LTE TDD system, the data transmission is based on scheduling, and scheduling information thereof (for example, information such as resource allocation and a data transmission format) is carried in downlink control information (Downlink Control Information, DCI), which includes a 4-bit HARQ process number field for indicating an HARQ process number used by the current data transmission. By using the system message notifying a sub-frame configuration 0 as an example, it may be seen from Table 2 that, the maximum number of downlink HARQ processes is 4, and at this time, after the UE receives the DCI and obtains, through resolving, the 4-bit HARQ process number field, the UE considers a value of the HARQ process number field as valid only when the value ranges from 0 to 3, and considers the value of the HARQ process number field as invalid when the value ranges from 4 to 15 and does not receive or send corresponding data. In the embodiment of the present invention, when determining the second HARQ process quantity according to the second HARQ process quantity indication information, the HARQ process number field in the DCI needs to be resolved by using the HARQ process quantity determined according to the second HARQ process quantity indication information. When the second HARQ process quantity indication information is not sent and the HARQ process quantity is determined according to the first HARQ process quantity indication information, the HARQ process number field in the DCI is resolved by using the HARQ process quantity determined according to the first HARQ process quantity indication information.

In the embodiment of the present invention, by receiving the second HARQ process quantity indication information sent by the base station, the UE can perform data communication with the base station by using different HARQ timing relationships and HARQ process quantities, and correspondingly resolve the HARQ process number field in the DCI. Particularly, for a UE configured with advanced functional characteristics such as TDD sub-frame configuration dynamic reconfiguration, aggregation of TDD carriers having different sub-frame configurations, and aggregation of an FDD carrier and a TDD carrier, data communication may be performed with the base station by using the HARQ timing relationship different from the HARQ timing relationship corresponding to the sub-frame configuration notified through the SIB1 message on the carrier.

Figure 8:
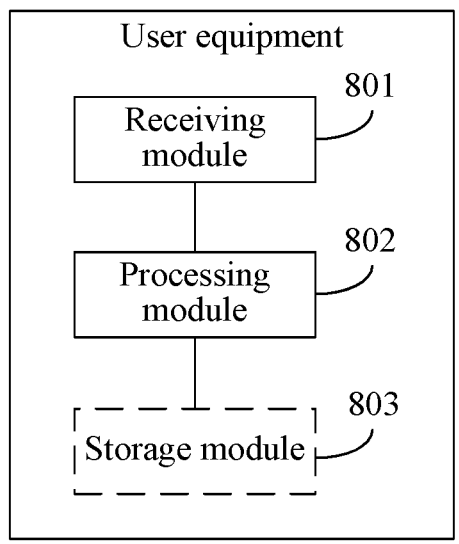
FIG. 8 is a schematic structural diagram of a user equipment according to an embodiment of the present invention.

Based on the method provided in the foregoing another embodiment, this embodiment further provides a user equipment, where the user equipment may execute the wireless communication method supporting HARQ of the foregoing another embodiment of the present invention. As shown in FIG. 8, the user equipment includes: a receiving module 801 and a processing module 802.

The receiving module 801 is configured to receive first hybrid automatic repeat request HARQ process quantity indication information sent by a base station; and the processing module 802 is configured to, if the receiving module 801 further receives second HARQ process quantity indication information sent by the base station, determine a second HARQ process quantity according to the second HARQ process quantity indication information, and perform data transmission with the base station through the receiving module 801 based on the determined second HARQ process quantity.

Moreover, the processing module 802 is further configured to, when the receiving module 802 does not receive the second HARQ process quantity indication information sent by the base station, determine a first HARQ process quantity according to the first HARQ process quantity indication information, and perform data transmission with the base station through the receiving module 801 according to the determined first HARQ process quantity.

In this embodiment, the second HARQ process quantity determined by the processing module 802 is the maximum number of downlink HARQ processes $M_{DL\_HARQ}$, or the maximum number of uplink HARQ processes $M_{UL\_HARQ}$, and the processing module 802 is further configured to calculate a size of an HARQ soft buffer and divide the soft buffer according to the maximum number of downlink HARQ processes $M_{DL\_HARQ}$, and perform data transmission with the base station based on the divided soft buffer and the second HARQ process quantity.

In this embodiment, in a carrier aggregation scenario, the receiving module is specifically configured to, for at least one component carrier, receive the first HARQ process quantity indication information of the at least one component carrier sent by the base station; and when the second HARQ process quantity indication information is further received, the second HARQ process quantity indication information received by the receiving module is the second HARQ process quantity indication information of the at least one component carrier; and the processing module, when performing data transmission with the base station, performs, according to the second HARQ process quantity, data transmission with the base station on the at least one component carrier, where:

the at least one component carrier is: a component carrier enabling a TDD sub-frame configuration dynamic reconfiguration function, or a secondary component carrier having a sub-frame configuration different from that of a primary component carrier.

In this embodiment, for aggregation of carriers having different sub-frame configurations, the receiving module 801 is specifically configured to, when the base station performs communication with the user equipment UE on multiple carriers at the same time, respectively receive the second HARQ process quantity indication information related to each secondary component carrier sent by the base station to the UE for each secondary component carrier, where the secondary component carrier has the sub-frame configuration different from that of the primary component carrier.

For the second HARQ process quantity indication information received by the receiving module 801, reference may be made to the description in the foregoing embodiment, and for how the processing module 802 determines the second HARQ process quantity according to the second HARQ process quantity indication information, reference may also be made to the corresponding description in the foregoing embodiment, which are not repeatedly described herein. It should be noted that, according to a requirement, the user equipment may further include a storage module 803, configured to store a value predefined for the second HARQ process quantity; or configured to store correspondence between the second HARQ process quantity and all supported dynamic sub-frame settings; or configured to store correspondence between the second HARQ process quantity and all combinations of possibly used sub-frame configuration information; or configured to store correspondence between the second HARQ process quantity and all supported combinations of the sub-frame configuration of the primary component carrier and the sub-frame configuration of the secondary component carrier. Specifically, reference may be made to the storage module 603.

Moreover, the processing module 802 is further configured to, when the receiving module 801 further receives the second HARQ process quantity indication information sent by the base station, resolve an HARQ process number field in downlink control information DCI according to the second HARQ process quantity.

It should be noted that, the modules of the user equipment execute contents such as information interaction and an execution process in the method according to another embodiment of the present invention. Specifically, reference may be made to the description of the method embodiment. Moreover, the embodiment of the user equipment is based on the same idea as the method embodiment of the foregoing method embodiment, and a technical effect brought thereby is the same as that of the method embodiment of the present invention. For specific content, reference may be made to the description in the method embodiment of the present invention, which is not repeatedly described herein.

It should be noted that, in the embodiments of the user equipment and base station, division of functional modules is merely an example, and in an actual application, the functions may be allocated to different functional modules for implementation according to a requirement, for example, considering a configuration requirement of corresponding hardware or implementation convenience of software, that is, internal structures of the user equipment and the base station are divided into different functional modules, so as to implement all or a part of the functions described in the foregoing. Moreover, in the actual application, the corresponding functional module in this embodiment may be implemented by corresponding hardware, and may also be implemented by corresponding hardware executing corresponding software. For example, the sending module may be hardware executing the function of the sending module, for example, a transmitter, and may also be a common processor or another hardware device capable of executing a corresponding computer program to implement the functions. For another example, the processing module may be hardware executing the function of the processing module, for example, a processor, and may also be another hardware device capable of executing a corresponding computer program to implement the functions. For still another example, the receiving module may be hardware executing the function of the receiving module, for example, a receiver, and may also be a common processor or another hardware device capable of executing a corresponding computer program to implement the functions. (All embodiments provided in this specification may apply the foregoing description principle).

Moreover, an embodiment of the present invention further provides a wireless communication system supporting HARQ, which includes the user equipment and the base station described in the foregoing embodiments. For specific structures and functions of the user equipment and the base station, reference may be made to the foregoing embodiments, and are not repeatedly described herein.

A person of ordinary skill in the art may understand that all or a part of the steps of the methods in the embodiments may be implemented by a program instructing relevant hardware. The program may be stored in a computer readable storage medium, and the storage medium may include: a read-only memory (ROM, Read-Only Memory), a random access memory (RAM, Random Access Memory), a magnetic disk, or an optical disk.

The method, user equipment, and base station provided in the embodiments of the present invention are described in detail. Specific examples are used to describe the principles and implementation manners of the present invention are described through specific examples. The description about the embodiments of the present invention is merely used to help understand the method and core ideas of the present invention. A person of ordinary skill in the art may make variations to the present invention in terms of the specific implementation manners and application scope according to the ideas of the present invention. Therefore, the content described herein shall not be construed as a limitation on the present invention.

What is claimed is:

1. A method performed by a base station, comprising:
   sending a system information block message that includes first downlink hybrid automatic repeat request (HARQ) process quantity indication information, wherein the first downlink HARQ process quantity indication information indicates first sub-frame configuration information of a secondary component carrier of at least two aggregated carriers, and wherein the at least two aggregated carriers comprise:
       a combination of at least one frequency division duplex (FDD) carrier and at least one time division duplex (TDD) carrier, or
       a combination of at least two TDD carriers having different sub-frame configurations;
   sending, to the terminal device through signaling dedicated to the terminal device, second downlink HARQ process quantity indication information of the secondary component carrier;
   determining, for the secondary component carrier, a HARQ process quantity according to the second downlink HARQ process quantity indication information, wherein a HARQ timing relationship of the secondary component carrier is determined based on the second downlink HARQ process quantity indication information but is not defined by the first sub-frame configuration information of the secondary component carrier, and the HARQ process quantity is the maximum number of downlink HARQ processes;
   determining according to the maximum number of downlink HARQ processes, a size of a HARQ soft buffer supported by the terminal device; and
   transmitting, based on the size of the HARQ soft buffer, data to the terminal device on the secondary component carrier.

2. The method according to claim 1, wherein: the aggregated carriers comprise the combination of the FDD carrier and the TDD carrier, and
   the second downlink HARQ process quantity indication information comprises a sub-frame configuration of the TDD carrier;
   the step of determining the HARQ process quantity comprises:
       determining a HARQ process quantity of the FDD carrier as the HARQ process quantity of the secondary component carrier if the secondary component carrier is the TDD carrier; or
       determining the HARQ process quantity of the secondary component carrier according to the sub-frame configuration of the TDD carrier if the secondary component carrier is the FDD carrier.

3. The method according to claim 1, wherein:
   the aggregated carriers comprise the combination of the FDD carrier and the TDD carrier, the second downlink HARQ process quantity indication information comprises configuration information of aggregation of the FDD carrier and the TDD carrier;
   the configuration information of aggregation of the FDD carrier and the TDD carrier comprises a sub-frame configuration of the TDD carrier; and
   the step of determining the HARQ process quantity comprises:
       determining, according to the configuration information of aggregation of the FDD carrier and the TDD carrier, a predefined value as the HARQ process quantity of the secondary component carrier.

4. The method according to claim 3, wherein the predefined value is equal to 8.

5. The method according to claim 1, wherein:
   the aggregated carriers comprise the combination of at least two TDD carriers having different sub-frame configurations;
   the second downlink HARQ process quantity indication information comprises configuration information of aggregation of the TDD carriers;
   the configuration information of aggregation of the TDD carriers comprises a sub-frame configuration of a primary component carrier and a sub-frame configuration of the secondary component carrier;
   the secondary component carrier has the sub-frame configuration different from that of the primary component carrier; and
   the step of determining the HARQ process quantity comprises:
       determining, according to the sub-frame configuration of the primary component carrier and the sub-frame configuration of the secondary component carrier, the HARQ process quantity of the secondary component carrier based on a correspondence between the second HARQ process quantity and a combination of the sub-frame configuration of the primary component carrier and the sub-frame configuration of the secondary component carrier.

6. The method according to claim 1, wherein:
   the second downlink HARQ process quantity indication information comprises second sub-frame configuration information; and
   the step of determining the HARQ process quantity comprises determining the HARQ process quantity of the secondary component carrier according to the second sub-frame configuration information.

7. The method according to claim 1, wherein:
   the secondary component carrier is: a component carrier enabling a TDD sub-frame configuration dynamic reconfiguration function, or the secondary component carrier having a sub-frame configuration different from that of a primary component carrier in the at least two aggregated carriers.

8. The method according to claim 1, wherein:
the signaling dedicated to the terminal device is a radio resource control message, a medium access control message, or physical-layer control signaling.

9. An apparatus, comprising:
a processor coupled with a non-transitory storage medium storing executable instructions; wherein the executable instructions, when executed by the processor, cause the apparatus to:
send a system information block message that includes first downlink hybrid automatic repeat request (HARQ) process quantity indication information, wherein at least two aggregated carriers are configured for a terminal device, the at least two aggregated carriers comprise a combination of at least one frequency division duplex (FDD) carrier and at least one time division duplex (TDD) carrier or a combination of at least two TDD carriers having different sub-frame configurations, and the first downlink HARQ process quantity indication information indicates first sub-frame configuration information of a secondary component carrier of the at least two aggregated carriers;
send, through signaling dedicated to the terminal device, second downlink HARQ process quantity indication information of the secondary component carrier;
determine, for the secondary component carrier, a HARQ process quantity according to the second downlink HARQ process quantity indication information received through the signaling dedicated to the terminal device, wherein a HARQ timing relationship of the secondary component carrier is determined based on the second downlink HARQ process quantity indication information but is not defined by the sub-frame configuration information, and the HARQ process quantity is the maximum number of downlink HARQ processes;
obtain a size of an HARQ soft buffer according to the maximum number of downlink HARQ processes; and
transmit, based on the size of the HARQ soft buffer, data to the terminal device on the secondary component carrier.

10. The apparatus according to claim 9, wherein:
the aggregated carriers comprise the combination of the FDD carrier and the TDD carrier,
the second downlink HARQ process quantity indication information comprises configuration information of aggregation of the FDD carrier and the TDD carrier;
the configuration information of aggregation of the FDD carrier and the TDD carrier comprises a sub-frame configuration of the TDD carrier; and
the determining the HARQ process quantity comprises:
when the secondary component carrier is the TDD carrier, determining a HARQ process quantity of the FDD carrier as the HARQ process quantity of the secondary component carrier; or
determining the HARQ process quantity of the secondary component carrier according to the sub-frame configuration of the TDD carrier when the secondary component carrier is the FDD carrier.

11. The apparatus according to claim 9, wherein:
the aggregated carriers comprise the combination of the FDD carrier and the TDD carrier,
the second downlink HARQ process quantity indication information comprises configuration information of aggregation of the FDD carrier and the TDD carrier;
the configuration information of aggregation of the FDD carrier and the TDD carrier comprises a sub-frame configuration of the TDD carrier; and
the determine the HARQ process quantity according to the second downlink HARQ process quantity indication information comprises:
determining, according to the configuration information of aggregation of the FDD carrier and the TDD carrier, a predefined value as the HARQ process quantity of the secondary component carrier.

12. The apparatus according to claim 11, wherein the predefined value stored in the storage is equal to 8.

13. The apparatus according to claim 9, wherein:
the aggregated carriers comprise the combination of at least two TDD carriers having different sub-frame configurations, the second downlink HARQ process quantity indication information comprises configuration information of aggregation of the TDD carriers;
the configuration information of aggregation of the TDD carriers comprises a sub-frame configuration of a primary component carrier and a sub-frame configuration of the secondary component carrier;
the memory is configured to store a correspondence between the HARQ process quantity and a combination of the sub-frame configuration of the primary component carrier and the sub-frame configuration of the secondary component carrier;
the determining the HARQ process quantity comprises:
determining, according to the sub-frame configuration of the primary component carrier and the sub-frame configuration of the secondary component carrier, the HARQ process quantity of the secondary component carrier based on a correspondence between the HARQ process quantity and a combination of the sub-frame configuration of the primary component carrier and the sub-frame configuration of the secondary component carrier, and the secondary component carrier has the sub-frame configuration different from that of the primary component carrier.

14. The apparatus according to claim 9, wherein:
the second downlink HARQ process quantity indication information comprises second sub-frame configuration information; and
the determining the HARQ process quantity comprises:
determining the HARQ process quantity of the secondary component carrier according to the second sub-frame configuration information.

15. The apparatus according to claim 9, wherein:
the secondary component carrier is a component carrier enabling a TDD sub-frame configuration dynamic reconfiguration function, or the secondary component carrier having a sub-frame configuration different from that of a primary component carrier in the at least two aggregated carriers.

16. The apparatus according to claim 9, wherein:
the signaling dedicated to the terminal device is a radio resource control message, a medium access control message, or physical-layer control signaling.

17. A non-transitory computer-readable storage medium storing instructions that, when executed by a processor, cause a terminal device to implement:
decode first downlink hybrid automatic repeat request (HARQ) process quantity indication information from a system information block message, wherein the terminal device is configured to communicate via at least two aggregated carriers comprising a combination of at least one frequency division duplex (FDD) carrier and at least one time division duplex (TDD) carrier or a combination of at least two TDD carriers having different sub-frame configurations, the first downlink HARQ process quantity indication information is first sub-frame configuration information of a secondary component carrier of the at least two aggregated carriers;

decode second downlink HARQ process quantity indication information of the secondary component carrier from signaling dedicated to the terminal device;

determine, for the secondary component carrier, a HARQ process quantity according to the second downlink HARQ process quantity indication information received through the signaling dedicated to the terminal device, wherein a used HARQ timing relationship of the secondary component carrier is determined based on the second downlink HARQ process quantity indication information, but is not a HARQ timing relationship defined by the sub-frame configuration information of the secondary component carrier in the system information block message, and the HARQ process quantity is the maximum number of downlink HARQ processes;

obtain a size of an HARQ soft buffer according to the maximum number of downlink HARQ processes; and receive, based on the size of the HARQ soft buffer, data on the secondary component carrier.

18. The non-transitory computer-readable storage medium according to claim 17, wherein:

the aggregated carriers comprise the combination of the FDD carrier and the TDD carrier, the second downlink HARQ process quantity indication information comprises configuration information of aggregation of the FDD carrier and the TDD carrier;

the configuration information of aggregation of the FDD carrier and the TDD carrier comprises a sub-frame configuration of the TDD carrier; and the instructions, when executed by the processor, cause the terminal device to determine the HARQ process quantity as follows:

when the secondary component carrier is the TDD carrier, determining a HARQ process quantity of the FDD carrier as the HARQ process quantity of the secondary component carrier; or when the secondary component carrier is the FDD carrier, determining the HARQ process quantity of the secondary component carrier according to the sub-frame configuration of the TDD carrier.

19. The non-transitory computer-readable storage medium according to claim 17, wherein:

the aggregated carriers comprise the combination of the FDD carrier and the TDD carrier, the second downlink HARQ process quantity indication information comprises configuration information of aggregation of the FDD carrier and the TDD carrier;

the configuration information of aggregation of the FDD carrier and the TDD carrier comprises a sub-frame configuration of the TDD carrier; and the instructions, when executed by the processor, cause the terminal device to determine the HARQ process quantity as follows:

determining, according to the configuration information of aggregation of the FDD carrier and the TDD carrier, a predefined value as the HARQ process quantity of the secondary component carrier.

20. The non-transitory computer-readable storage medium according to claim 19, wherein the predefined value is equal to 8.

21. The non-transitory computer-readable storage medium according to claim 17, wherein:

the aggregated carriers comprise the combination of at least two TDD carriers having different sub-frame configurations, the second downlink HARQ process quantity indication information comprises configuration information of aggregation of the TDD carriers;

the configuration information of aggregation of the TDD carriers comprises a sub-frame configuration of a primary component carrier and a sub-frame configuration of the secondary component carrier;

the secondary component carrier has the sub-frame configuration different from that of the primary component carrier; and the instructions, when executed by the processor, cause the terminal device to determine the HARQ process quantity as follows:

determining, according to the sub-frame configuration of the primary component carrier and the sub-frame configuration of the secondary component carrier, the HARQ process quantity of the secondary component carrier by searching for correspondence between the HARQ process quantity and a combination of the sub-frame configuration of the primary component carrier and the sub-frame configuration of the secondary component carrier.

22. The non-transitory computer-readable storage medium according to claim 17, wherein:

the second downlink HARQ process quantity indication information comprises second sub-frame configuration information; and the instructions, when executed by the processor, cause the terminal device to determine the HARQ process quantity as follows:

determine the HARQ process quantity of the secondary component carrier according to the second sub-frame configuration information.

23. A non-transitory computer-readable storage medium storing instructions that, when executed by a processor, cause a base station to implement:

send a system information block message that includes first downlink hybrid automatic repeat request (HARQ) process quantity indication information, wherein at least two aggregated carriers are configured for a terminal device, and the at least two aggregated carriers comprising a combination of at least one frequency division duplex (FDD) carrier and at least one time division duplex (TDD) carrier or a combination of at least two TDD carriers having different sub-frame configurations, the first downlink HARQ process quantity indication information indicates first sub-frame configuration information of a secondary component carrier of the at least two aggregated carriers;

send, through signaling dedicated to the terminal device, second downlink HARQ process quantity indication information of the secondary component carrier;

determine, for the secondary component carrier, a HARQ process quantity according to the second downlink HARQ process quantity indication information received through the signaling dedicated to the terminal device, wherein a HARQ timing relationship of the secondary component carrier is determined based on the second downlink HARQ process quantity indication information but is not defined by the first sub-frame configuration information of the secondary component carrier, and the HARQ process quantity is the maximum number of downlink HARQ processes;

determine, according to the maximum number of downlink HARQ processes, a size of a HARQ soft buffer supported by the terminal device; and transmit, based on the size of the HARQ soft buffer, data to the terminal device on the secondary component carrier.

24. The non-transitory computer-readable storage medium according to claim 23, wherein:

the aggregated carriers comprise the combination of the FDD carrier and the TDD carrier, the second downlink HARQ process quantity indication information comprises configuration information of aggregation of the FDD carrier and the TDD carrier;

the configuration information of aggregation of the FDD carrier and the TDD carrier comprises a sub-frame configuration of the TDD carrier; and the determining the HARQ process quantity comprises:

determining a HARQ process quantity of the FDD carrier as the HARQ process quantity of the secondary component carrier when the secondary component carrier is the TDD carrier; or determining the HARQ process quantity of the secondary component carrier according to the sub-frame configuration of the TDD carrier when the secondary component carrier is the FDD carrier.

25. The non-transitory computer-readable storage medium according to claim 23, wherein:

the aggregated carriers comprise the combination of the FDD carrier and the TDD carrier, the second downlink HARQ process quantity indication information comprises configuration information of aggregation of the FDD carrier and the TDD carrier;

the configuration information of aggregation of the FDD carrier and the TDD carrier comprises a sub-frame configuration of the TDD carrier; and the determining the HARQ process quantity comprises:

determining, according to the configuration information of aggregation of the FDD carrier and the TDD carrier, a predefined value as the HARQ process quantity of the secondary component carrier.

26. The non-transitory computer-readable storage medium according to claim 23, wherein:

the aggregated carriers comprise the combination of at least two TDD carriers having different sub-frame configurations, the second downlink HARQ process quantity indication information comprises configuration information of aggregation of the TDD carriers;

the configuration information of aggregation of the TDD carriers comprises a sub-frame configuration of a primary component carrier and a sub-frame configuration of the secondary component carrier;

the secondary component carrier has the sub-frame configuration different from that of the primary component carrier; and the determining the HARQ process quantity comprises:

determining, according to the sub-frame configuration of the primary component carrier and the sub-frame configuration of the secondary component carrier, the HARQ process quantity of the secondary component carrier by searching for correspondence between the second HARQ process quantity and a combination of the sub-frame configuration of the primary component carrier and the sub-frame configuration of the secondary component carrier.

* * * * *